United States Patent [19]

Taniguchi

[11] Patent Number: 5,125,930
[45] Date of Patent: Jun. 30, 1992

[54] POLYMERIC CATIONIC DYES INCLUDING A QUATERNIZED PYRIDINIUM GROUP

[75] Inventor: Koichi Taniguchi, Wakayama, Japan

[73] Assignee: Nippon Chemical Works Co., Ltd., Wakayama, Japan

[21] Appl. No.: 618,699

[22] Filed: Nov. 27, 1990

Related U.S. Application Data

[63] Continuation of Ser. No. 269,563, Nov. 10, 1988, abandoned.

[30] Foreign Application Priority Data

Nov. 24, 1987 [JP] Japan .................. 62-294198

[51] Int. Cl.⁵ .................. C09B 57/00; C09B 23/16
[52] U.S. Cl. .................. 8/655; 8/647; 8/636; 8/657; 8/919; 544/190; 544/198; 544/209; 546/256; 546/264; 546/329
[58] Field of Search .................. 8/655, 647, 636, 657, 8/919; 544/190, 198, 209; 546/256, 264, 329

[56] References Cited

U.S. PATENT DOCUMENTS

| | | | |
|---|---|---|---|
| 3,632,302 | 1/1972 | Basle | 8/655 |
| 3,957,767 | 5/1976 | Kaeppeli | 8/655 |
| 4,563,191 | 1/1986 | Hähnke et al. | 8/655 |
| 4,600,776 | 7/1986 | Meisel et al. | 544/198 |
| 4,652,645 | 3/1987 | Stingelin et al. | 544/198 |

Primary Examiner—Paul Lieberman
Assistant Examiner—Bradley A. Swope
Attorney, Agent, or Firm—Abelman Frayne and Schwab

[57] ABSTRACT

Polymeric cationic dyes wherein the same or different monomer components represented by the following formula (1) are linked at the terminal amino groups by a crosslinking agent:

$$H_2N-A-CH=CH-B \tag{1}$$

in which A represents a substituted or unsubstituted benzene ring and B represents the radical of a quaternized methylene active compound. The dyes are used in particular for dyeing paper.

8 Claims, No Drawings

POLYMERIC CATIONIC DYES INCLUDING A QUATERNIZED PYRIDINIUM GROUP

This is a continuation of application Ser. No. 269,563, filed on Nov. 10, 1988, now abandoned.

BACKGROUND OF THE INVENTION

1. Field of the Invention

This invention relates to new polymeric cationic dyes for use in the coloring, surface dyeing, inking or printing of substrates such as paper, fiber, leather and the like. The invention also relates to a process for dyeing paper with said new dyes and to paper dyed therewith.

2. Description of the Prior Art

A variety of cationic dyes have been employed for the dyeing of paper, pulp or the like. However, these cationic dyes generally suffer from the disadvantages of considerable loss in tinctorial strength when applied to the materials such as paper and pulp, with the result that the materials are not deeply dyed and a large amount of dyes not fixed on the materials remains in the waste water after dyeing the materials, which leads to environmental problems of water pollution and the like.

On one hand, dyes are shifting to liquid products in recent years for reasons of easiness of handling and removal of dust pollution. However, cationic dyes are of poor storage stability at temperatures and times encountered in formation of dyes into liquid, as compared to other types of dyes and suffer undesirable phenomena such as a lowering of concentration, change of color, occurrence of an insoluble material, etc. due to storage. In particular, the pollution arising from the waste water as mentioned above is in serious problem to a dyeing factory. Now, a variety of dyeing assistants are often used to enhance tinctorial strength of dyes. However, this approach provides increased cost and fails to achieve a desired effect. In view of this problem, basic dyes have been proposed in U.S. Pat. No. 4,323,362. The dyes are stated to possess good substantivity on paper and to alleviate environmental problems relating to the discharge of the waste water after dyeing paper. However, those dyes are not satisfactory for deep dyeing and do not have tinctorial strength enough to cope with a reduction in dyeing time, simplification of dyeing equipment, etc. which bring about a reduction in dyeing cost.

SUMMARY OF THE INVENTION

An object of the present invention is to provide new polymeric cationic dyes having highly increased tinctorial strength which permits deep dyeing, complete utilization of color (all amounts of dyes being fixed on the materials such as paper and pulp) and results in substantially colorless waste water after dyeing the materials, thus removing environmental problems of water pollution.

The polymeric cationic dyes of the present invention are those dyes wherein the same or different monomer components represented by the following formula (1) are linked at the terminal amino groups by a crosslinking agent:

$$H_2N-A-CH=CH-B \quad (1)$$

in which A represents a substituted or unsubstituted benzene ring and B represents the radical of a quaternized methylene active compound. The term "polymeric cationic dye" as used herein refers generically to the compounds containing in the structure two or more units of $-HN-(A-CH=CH\text{13 }B)$ which are crosslinked at the terminal amino groups, specific examples of which include those containing the dimer and trimer of the compound of the formula (1) crosslinked at the terminal amino groups.

DESCRIPTION OF PREFERRED EMBODIMENTS

Examples of the substituents for substituted benzene ring of A in the formula (1) include alkyl, alkoxy, halogen and the like. The radicals of the quaternized methylene active compounds represented by B are quaternized heterocyclic radicals in which the methylene active group is methyl or methylene, which radicals are for instance derived from quinolinium, picolinium, benzothiazolium, benzoimidazolium, indolium or quinoxalonium series or the like. Representative examples of B are, not by way of limitation, the radicals of the following heterocyclic compounds which are quaternized with known quaternization agents. Those heterocyclic compounds include α-picoline, γ-picoline, 2-methyl-4-ethyl pyridine, 2-methyl-5-ethyl pyridine, 3-ethyl-4-methyl pyridine, 2-methyl-5-butyl pyridine, 2,4-lutidine, 2,6-lutidine, 2,5-lutidine, 3,4-lutidine, 2-methy quinoline, 4-methyl quinoline, 2,3,3-trimethyl indoline, 2,3,3-trimethyl-5-chloro indoline, 1,2-dimethyl benzimidazole, 1,2,5-trimethyl benzimidazole, 1-methyl-2-cyanomethyl benzimidazole, 2-methyl benzothiazol, 2-methyl-6-methoxy benzothiazol, 1,3-dimethyl quinoxalone, etc. Known quaternization agents include dimethyl sulfate, diethyl sulfate, dipropyl sulfate, dibutyl sulfate, methyl chloride, ethyl chloride, benzyl chloride, methyl iodide, ethyl iodide, butyl iodide, methyl bromide, ethyl promide, benzyl bromide, methyl p-toluene sulfonate, n-butyl p-toluene sulfonate, ethylene chlorohydrine, ethylene oxide, propylene oxide, butylene oxide, phenyl glycidyl ether, allyl glycidyl ether, acrylamide, etc.

The polymeric cationic dyes of the present invention may be prepared by reacting a substituted or unsubstituted amino benzaldehyde with a compound containing an active methyl or methylene group having a quaternary nitrogen atom in the conventional manner to prepare a monomer component of the formula (1) and crosslinking said monomer component at the terminal amino groups with a suitable crosslinking agent for dimerization, trimerization or polymerization. The amino benzaldehydes used in this reaction include those wherein the benzene ring may be substituted by alkyl, alkoxy, halogen, etc., with p-amino benzaldehyde being especially preferred. The crosslinking agents used in the present invention include phosgene, polycarboxylic acid halides, polycarboxylic acid esters, poly alkyl halides, xylylene dihalides or halogenated triazines and pyrimidines wherein one halogen atom may be substituted by the radicals of the compounds having an amino or hydroxyl group which is reactive to an active halogen. Specific examples of the crosslinking agents are, not by way of limitation, phosgene, phenyl chloroformate, succinyl chloride, terephthaloyl dichloride, ethyl malonate, ethylene dibromide, xylylene dichloride, 2,4,6-trichlorotriazine,
2,4,6-trifluorotriazine,
2,4-dichloro-6-(dimethylaminopropylamino)triazine,
2,4-dichloro-6-hydroxytriazine,
2,4-difluoro-6-(trimethylaminoethylamino)triazine chloride, 2.4-difluoro-6-(N-carboxymethylamino)triazine.
2.4-dichloro-6-(N,N-dihydroxyethylamino)triazine.
2.4-difluoro-6-(N-hydroxypropylamino)triazine.
2.4-dichloro-6-(N,N-dimethylamino)triazine.
2.4-difluoro-6-(N,N-dihexylamino)triazine.
2.4-dichloro-6-(N-2-sulfoethylamino)triazine.
2.4.6-trichloropyrimidine.
2.5.6-trichloro-4-pyridinium pyrimidine chloride. etc.

The polymeric dyes of the present invention prepared by using as crosslinking agents especially phosgene, halogenated triazines or the derivatives thereof achieve remarked effects due to increased substantivity and low pH sensitivity. Crosslinking proceeds by dehalogenation or dehydration reaction between the terminal amino groups of the monomer components of the formula (1) and the crosslinking agents. Further, the crosslinking can be carried out in any order with suitable assisting agents added in water or an organic solvent.

The polymeric cationic dyes of the present invention may also be prepared in any forms such as powder, granule, liquid or the like according to the method known to those skilled in the art. Such dyes can be applied to suitable substrates such as paper, fiber (natural or synthetic) e.g., polyacrylonitrile, acid modified polyester and leather, etc. to perform the coloring, surface dyeing, printing or inking of the substrates. Further, the dyes of the invention can be used as printing ink, recording ink, etc. In particular, the dyes of the invention are of excellent affinity to paper and pulp. The attainable hues range from yellow to violet.

According to the dyes of the present invention, the advantages are attained that tinctorial strength is highly increased to permit deep dyeing which was not attainable by prior cationic dyes, the whole amount of dyes is fixed on the dyed materials and hence no dyes are contained in the waste water after dyeing the materials and there is no possibility of water pollution. Further, the dyes of the invention are of great value in terms of economy of reduced dyeing time, no need of any dyeing assistants, etc. which are attributable to high tinctorial strength not found in prior cationic dyes. In addition, they have very excellent properties to storage stability even when formed into a liquid product, in contrast to prior cationic dyes. This may be attributable to the fact that the new dyes of the present invention have highly stable chemical structure as compared to prior cationic dyes.

The following examples concretely illustrate the preparation of dyes according to the present invention and the application thereof but are not to be construed to limit the scope of the invention. Unless otherwise stated, all parts are by weight.

EXAMPLE 1

60.5 parts of p-aminobenzaldehyde and 110 parts of 1,4-dimethylpyridinium-methylsulfate were heated under reflux in 500 parts of alcohol for 5 hours in the presence of 1 part of piperidine. After cooling, the reaction mixture was filtered with suction and washed with alcohol to give 135 parts of a compound of the formula

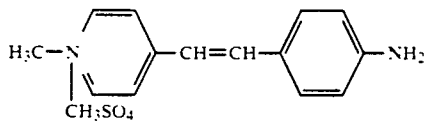

66.4 parts of the compound of the above formula as prepared above were dissolved in 1000 parts of water and cooled to 5° C. To the solution were added 18.4 parts of cyanuric chloride and the mixture was maintained at 10° C. for 2 hours, during which period the pH was maintained at 5–6 by adding dropwise 10% solution of soda ash and elevated to 45° C. over a 0.5 hour time. The mixture was reacted at a temperature of 45° to 60° C. for 1.5 hours, charged with 12.5 parts of diethanolamine and 6 parts of sodium carbonate and further reacted at a temperature of 90° to 95° C. for 3 to 5 hours to complete the reaction. The reaction solution was spray dried to give 82 parts of a yellow dye having the maximum absorption wavelength ($\lambda_{max}$) at 422mm (DMF) and represented by the following formula

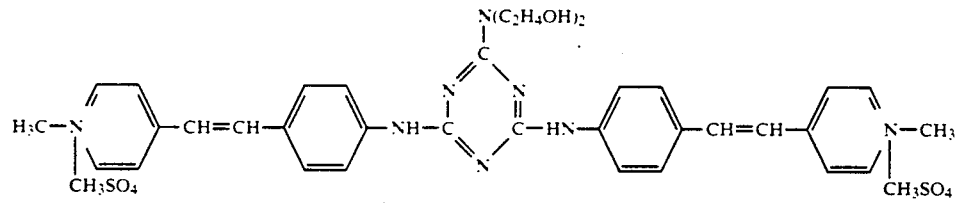

The dye was dissolved in water to prepare a stock solution. A pulp was continuously dyed with the stock solution. The pulp was subjected to a paper machine to yield a paper which was dyed in a brilliant greenish yellow and had excellent levelling property. The waste water after dyeing the paper was substantially colorless.

Dyes with similar excellent dyeing properties were obtained from the monomer components listed in the Table. The hue shown was that obtained with bleached sulfite paper stock.

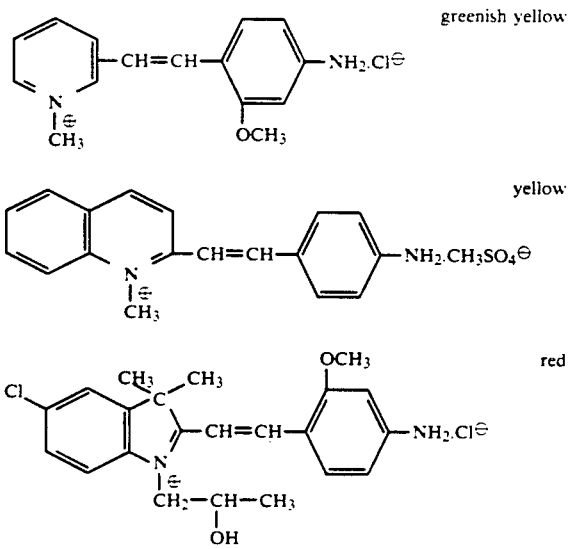

-continued

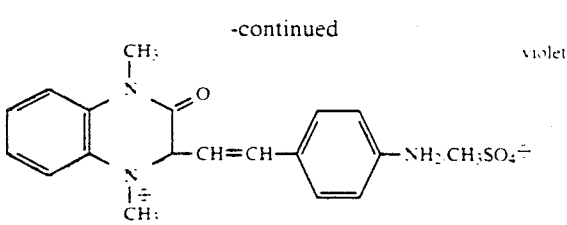

violet

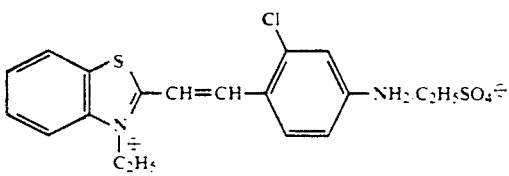

yellow

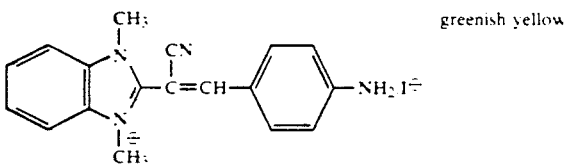

greenish yellow

EXAMPLE 2

In 500 parts of water were dissolved 64.4 parts of a compound of the formula

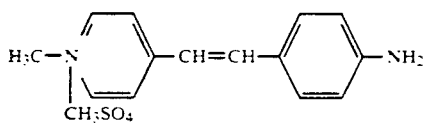

which was prepared in the same manner as in Example 1. The solution was cooled to 5° C., charged with 18.4 parts of cyanuric chloride, gradually raised to 60° C. while keeping the pH at 5-6 by adding dropwise a 10% sodium carbonate solution and reacted at the same temperature for 2 hours to complete the reaction. Thereafter, the reaction mixture was charged with 14.5 g of sodium salt of taurine and further 5.5 parts of sodium carbonate, heated at 95° C. and reacted for 3 hours. After cooling, a precipitated cake was filtered with suction to give 100 parts of a wet cake containing 60 parts of a compound having the following formula and the maximum absorption wavelength ($\lambda_{max}$) at 422 mm (DMF).

100 Parts of the wet cake were charged with 40 parts of glacial acetic acid and 25 parts of ethylene glycol to make the total of 200 parts with further 35 parts of water. The mixture was heated at 70° C to prepare a liquid composition containing 30% of a yellow dye represented by the above formula.

This composition could be diluted in any proportions with water and no change of properties was observed after storage for 6 months. The composition was diluted with water to prepare a stock solution. A pulp was continuously dyed with the stock solution. The pulp was subjected to a paper machine to provide a paper which was dyed in a brilliant greenish yellow and had excellent levelling property. The waste water after dyeing the paper was substantially colorless.

Good paper dyes were also obtained by employing diethylamine, monoethanolamine, dimethylamine, monoethylamine, di-isopropanolamine, ethylenediamine, morpholine, aniline, N,N-dihexylamine, ammonia, triethylenetetramine, sarcosine, propanolamine, dimethylaminopropylamine, dimethylaminoethylamine, diethylaminomethylamine, 1,3-diaminopropane, bis-(3-aminopropyl) ether, piperidine, N-aminoethyl piperidine, N-aminopropyl morpholine, methyliminobispropylamine, piperazine, 1,4-bisaminopropyl piperazine, 1-amino-4-methyl piperazine, etc., in place of sodium salt of taurine.

EXAMPLE 3

55.6 Parts of a compound represented by the formula

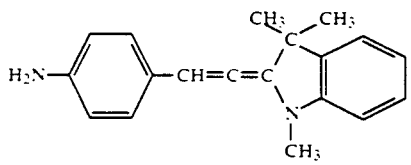

which was prepared from p-aminobenzaldehyde and 1,3,5-trimethyl-2-methylene-indoline were dissolved in 2000 parts of water with 15 parts of acetic acid added, from which any free amino group was removed by adding 30 parts of sodium acetate and blowing phosgene at 30° C. The resulting solution was charged with 20 parts of hydrochloric acid, raised to 50° C. and charged with 100 parts of sodium chloride to precipitate a dye. The dye was filtered and dried at 60° C to give 53 parts of an orange dye having the following formula and the maximum absorption wavelength ($\lambda_{max}$) at 566 mm (DMF).

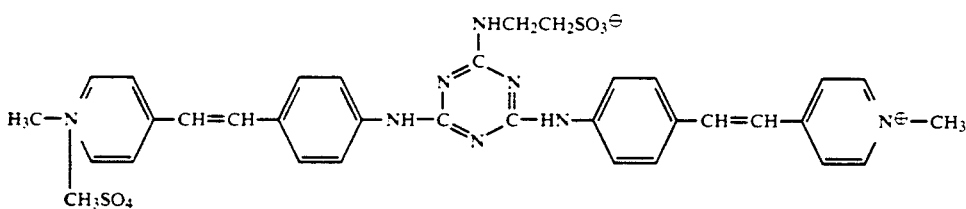

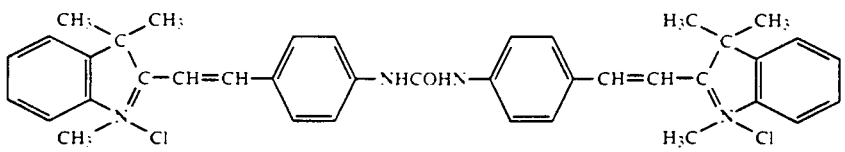

This dye colored a polyacrylonitrile fiber in orange with excellent fastness.

Good dyes were also obtained by substitution for phosgene of phenylchloroformate, succinyl chloride, terephthaloyl dichloride, adipoyl chloride, etc.

EXAMPLE 4

In 1000 parts of water were dissolved 37.5 parts of a compound represented by the formula

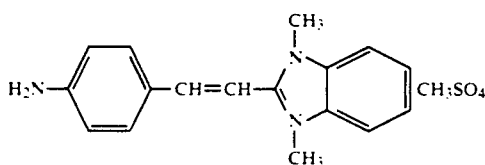

which was prepared from p-aminobenzaldehyde and 1,2,3-trimethylbenzimidazole methosulfate in the same manner as in Example 1. The solution was cooled to 5° C., charged with 18.4 parts of cyanuric chloride and kept below 10° C. until the completion of the reaction. To this reaction solution were added 55.3 parts of a compound represented by the formula

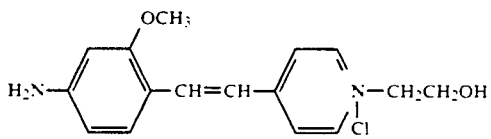

which was prepared from 2-methoxy-4-aminobenzaldehyde and 1-hydroxyethyl-4-methylpyridinium chloride by the same way as in Example 1. The mixture was gradually elevated to 60° C. while adjusting the pH to 5-6, reacted at this temperature for 2 hours, and charged with 6 parts of soda ash and reacted at a temperature of 90° to 95° C. for 3 hours. The crystals were separated out by addition of 100 g of NaCl, filtered and dried to leave 90 parts of a yellow dye having the maximum absorption wavelength ($\lambda_{max}$) at 435 mm (DMF) and represented by the following formula. This dye colored a paper material in yellow.

Good dyes were also obtained by substitution for cyanuric chloride of 2,4,6-trifluorotriazine, 2,4,6-trichloropyrimidine, 2,5,6-trichloro-4-pyridinium, pyrimidine chloride, etc.

EXAMPLE 5

100 Parts of 20% aqueous suspension of bleached sulfite pulp were mixed with 1 part of 2% aqueous solution of the dye prepared in Example 2, the mixture was stirred for 30 seconds and subjected to a paper machine to obtain a paper which was dyed in a brilliant greenish yellow and had very good bleed resistance. The waste water after dyeing the paper was colorless.

EXAMPLE 6

50 Parts of polyacrylonitrile fiber were introduced into an aqueous dyebath containing 0.15 part of 30% acetic acid, 0.1 part of sodium acetate and 0.1 part of the dye prepared in Example 3, heated to the boiling point over a 30 minutes time and dyed at this temperature for 50 minutes. Subsequent rinsing and drying gave brilliant orange, fast dyeings.

EXAMPLE 7

30 Parts of waste-telephone book, 30 parts of wood pulp and 40 parts of waste-news paper were beaten to prepare a 1% aqueous pulp dispersion. This dispersion was added with 10 parts of a 2% aqueous solution of the compound prepared in Example 1 to a head box to make a paper sheet. This paper had a deep greenish yellow shade having good color fastness to water and the waste water after dyeing the paper was substantially colorless.

What is claimed is:

1. A cationic dye wherein two compounds, each of the formula $H_2N-A-CH=CH-B$ in which A is a benzene ring optionally substituted by alkyl, alkoxy or halogen and B is a quaternized pyridinium ring, are linked through a terminal amino group with —CO— or a triazine of the formula

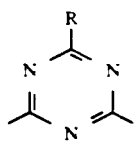

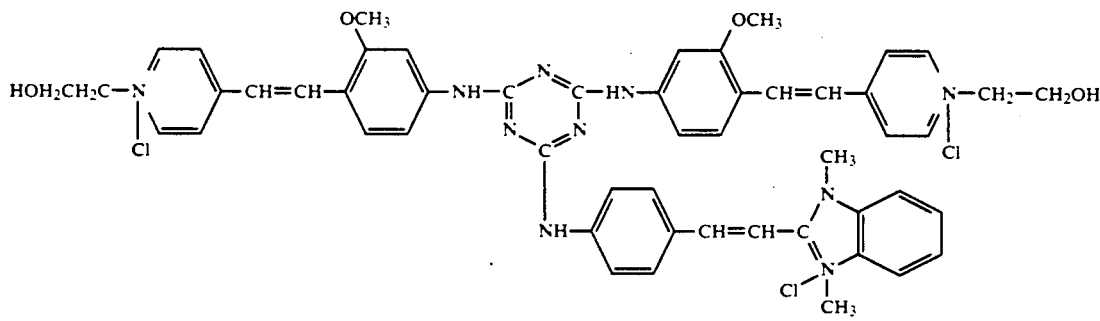
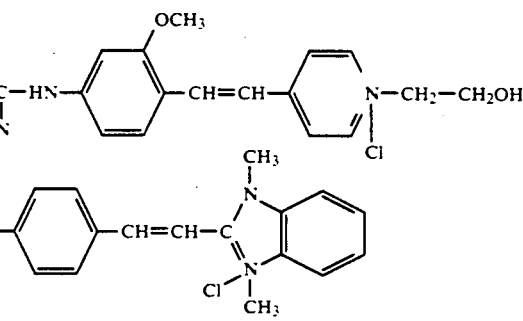

in which R is halogen, hydroxyl or substituted or unsubstituted amino.

2. A dye of claim 1 represented by the following formula

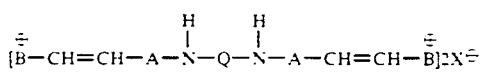

in which A and B are as defined above, Q is —CO— or

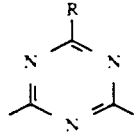

where R is as defined above and X⁻ is an anion.

3. A dye of claim 1 wherein A is a benzene ring and B is a pyridinium ring quaternized by $C_1$-$C_4$ alkyl, hydroxy ($C_2$-$C_4$) alkyl or benzyl.

4. A dye of claim 1 wherein A is a benzene ring substituted by alkyl, alkoxy or halogen and B is a pyridinium ring quaternized by $C_1$-$C_4$ alkyl, hydroxy ($C_2$-$C_4$) alkyl or benzyl.

5. A dye of claim 2 wherein Q is —CO—.

6. A dye of claim 2 wherein Q is

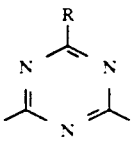

wherein R is as defined above.

7. A dye of claim 1 wherein the substituted amino in R is alkylamine, alkanolamine or alkylenepolyamine.

8. A dye of claim 1 wherein the substituted amino in R is ($C_1$-$C_4$) alkylamine, hydroxy ($C_2$-$C_4$) alkylamine, di($C_1$-$C_4$) alkylamino ($C_1$-$C_4$) alkylamine, β-sulfoethylamine or carboxymethylamine.

* * * * *